United States Patent
Wang et al.

(10) Patent No.: US 7,301,788 B1
(45) Date of Patent: Nov. 27, 2007

(54) POWER TRANSFORM DEVICE AND ELECTRONIC DEVICE FOR REACHING LOW ACOUSTIC NOISE

(75) Inventors: Po-Wen Wang, Taipei Hsien (TW); Chia-Tse Yeh, Tao-Yuan Hsien (TW); Chien-Kun Huang, Taipei (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 0 days.

(21) Appl. No.: 11/566,239

(22) Filed: Dec. 4, 2006

(30) Foreign Application Priority Data

Jul. 26, 2006 (TW) .............................. 95127303 A

(51) Int. Cl.
*H02H 7/122* (2006.01)
(52) U.S. Cl. ................. 363/56.01; 363/407; 363/56.12
(58) Field of Classification Search .................. 363/40, 363/55–56.12
See application file for complete search history.

(56) References Cited

U.S. PATENT DOCUMENTS

| | | | |
|---|---|---|---|
| 5,243,230 A | 9/1993 | Itou et al. | |
| 5,812,385 A | 9/1998 | Leu | |
| 6,051,961 A | 4/2000 | Jang et al. | |
| 6,169,672 B1 | 1/2001 | Kimura et al. | |
| 6,487,094 B1* | 11/2002 | Weng et al. | 363/56.01 |
| 6,876,556 B2* | 4/2005 | Zhu et al. | 363/56.02 |
| 7,130,204 B2* | 10/2006 | Tsuruya | 363/56.12 |

* cited by examiner

*Primary Examiner*—Jessica Han
(74) *Attorney, Agent, or Firm*—Winston Hsu

(57) ABSTRACT

A low acoustic noise solution for snubber circuits is utilized for relieving spike noise under a low-load mode of a snubber circuit, and for avoiding electromagnetic interference under a high-load mode of said snubber circuit. A power transform device utilizing the low acoustic solution includes a power source node, a switch node, a ground node, a transformer, a third switching unit, a first spike noise snubber circuit, a first switch unit, a second spike noise snubber circuit, and a second switch unit. When the power transform device is under the low-load mode, the first spike noise snubber circuit is used to absorb power discharged from the transformer so that spike noise is relived. When the power transform device is under the high-load mode, both the first and the second spike noise snubber circuits are used to absorb power so that electromagnetic interference is relieved.

21 Claims, 13 Drawing Sheets

POWER TRANSFORM DEVICE AND ELECTRONIC DEVICE FOR REACHING LOW ACOUSTIC NOISE

BACKGROUND OF THE INVENTION

1. Field of the Invention

The present invention provides a power transform device and an electronic device, and more particularly, to a power transform device and an electronic device for reaching low acoustic noise.

2. Description of the Prior Art

There are various elements in an electronic device, and each of said elements requires a specific operating voltage. Therefore, in an electronic device, a power transform device is utilized for transforming voltage levels in a raising manner or in a reductive manner, and for stabilizing said transformed voltage levels. In the prior art, a conventional power transform device is manipulated by utilizing a pulse width modulation technique or a pulse frequency modulation technique for supplying transformed power.

Please refer to FIG. 1, which is a diagram of a conventional power transform device 100. The power transform device 100 comprises a capacitor C11, resistors R11 and R21, a first switch unit D11, a second switch unit Q11, a switch node A1, a power source node B1+, a ground node F1, and a transform element TF1. The first switch unit D11 is a diode for being activated when a voltage level at an input terminal of the first switch element D11 is higher than a voltage level at an output terminal of the first switch element D11. The second switch unit Q11 is a metal-oxide semiconductor transistor for adjusting a resistance of a resistor between the drain and the source of the second switch unit Q11 according to a voltage level at the gate of the second switch unit Q11 for enabling or disabling an electrical connection between said drain and said source of the second switch unit Q11. The transform element TF1 is a coupling element of double winding, for performing power transformation on received current and for outputting power at a specific voltage level. When the second switch unit Q11 is short-circuited, a received current of the power source node B1+ flows through the transform element TF1, the second switch unit Q11, the resistor R21, and the ground node F1 in order. At the same time, an input voltage level of the first switch unit D11 is not higher than an output voltage level of the first switch unit D11, the first switch unit D11 remains open-circuited. When the second switch unit Q11 is open-circuited, a current flow from the drain to the source of the second switch unit 11 dissipates, and then the transform element TF1 resists said dissipating current flow for releasing power. Therefore, a current flow leads to the first switch unit D11 for activating the first switch D11, and then heads back to the power source node B1+ through a parallel connection of both the capacitor C11 and the resistor R11. Moreover, when the second switch unit Q11 becomes open-circuited instead of short-circuited, a counter-electromotive force generated from the transform element TF1 charges the capacitor C11 with a spike voltage. After the capacitor C11 absorbs power from the spike voltage, said power is discharged from the resistor R11, and additional power consumption is thus generated.

According to variant voltages received by the power source node B1+, the conventional power transform device 100 may be operated under two different modes including a high-load mode and a low-load mode. For meeting regulations of power, power consumption of the conventional transform device 100 under the low-load mode has to be less than 1 watt. Therefore, a capacitance of the capacitor C11 has to be decreased whereas a resistance of the resistor R11 has to be increased. Similarly, for reducing additional power consumption, an operating frequency of the conventional power transform device 100 has to be lowered for operating under a burst mode. However, when the operating frequency of the conventional power transform device 100 is lowered to an audio frequency domain, harsh noise is generated. The harsh noise may be relieved by reducing power absorbed with the series connection formed from both the capacitor C11 and the resistor R11. However, when the conventional power transform device 100 operates under the high-load mode, since power absorbed by the series connection of the capacitor C11 and the resistor R11 is getting lower, the spike voltage cannot be absorbed completely, and related electromagnetic interference (EMI) is getting heavier also. On the contrary, when the spike voltage is effectively absorbed with higher power absorbed by the series connection of the capacitor C11 and the resistor R11, related noise cannot be relieved.

SUMMARY OF THE INVENTION

Therefore, a power transform device and an electronic device for reaching low acoustic noise is provided in the present invention for relieving noise and electromagnetic interference of a conventional power transform device.

The claimed invention provides a power transform device with a snubber circuit for reaching low acoustic noise. The power transform device comprises a power source node, a switch node, a ground node, a transform element, a first spike noise snubber, a second spike noise snubber, a second switch unit, and a third switch unit. The transform element is electrically coupled between the power source node and the switch node. The first spike noise snubber has a first terminal, which is electrically coupled to the power source node, and a second terminal. The first switch unit is electrically coupled between the second terminal of the first spike noise snubber and the switch node. The second spike noise snubber has a first terminal, which is electrically coupled to the power source node, and a second terminal. The second switch unit is electrically coupled between the second terminal of the first spike noise snubber and the second terminal of the second spike noise snubber. The third switch unit is electrically coupled between the ground node and the switch node for selectively conducting or cutting off a current flowing between the ground node and the switch node. Spike noise is generated when the third switch unit is switched from conduction to cut off. The first switch unit is conducted when a voltage difference between the second terminal of the first spike noise snubber. The switch node is larger than a first predetermined voltage. The second switch unit is conducted when a voltage difference between the second terminal of the first spike noise snubber. The second terminal of the second spike noise snubber is larger than a second predetermined voltage, which is larger than the first predetermined voltage. Spike noise is generated when the third switch unit is cutting off instead of being conducted. The first switch unit is conducted for snubbing the generated spike noise with the first spike noise snubber when the generated spike noise is higher than the first predetermined voltage but lower than the second predetermined voltage. Both the first switch unit and the second switch unit are conducted for snubbing the generated spike noise with both the first spike noise snubber and the second spike noise snubber simultaneously when the generated spike noise is higher than the second predetermined voltage.

The claimed invention also provides an electronic device selectively operating under a normal mode or a stand-by mode for reaching low acoustic noise. The electronic device comprises a power source node, a switch node, a ground node, a transform element, a first spike noise snubber, a first switch unit, a second spike noise snubber, a second switch unit, and a third switch unit. The transform element is electrically coupled between the power source node and the switch node. The first spike noise snubber has a first terminal, which is electrically coupled to the power source node, and a second terminal. The first switch unit is electrically coupled between the second terminal of the first spike noise snubber and the switch node. The second spike noise snubber has a first terminal, which is electrically coupled to the power source node, and a second terminal. The second switch unit is electrically coupled between the second terminal of the first spike noise snubber and the second terminal of the second spike noise snubber. The third switch unit is electrically coupled between the ground node and the switch node for selectively conducting or cutting off a current flowing between the ground node and the switch node. Spike noise is generated when the third switch unit is switched from conduction to cut off. The first switch unit is conducted when a voltage difference across the first switch unit is larger than a first predetermined voltage. The second switch unit is conducted when a voltage difference across the second switch unit is larger than a second predetermined voltage, which is larger than the first predetermined voltage. The first switch is conducted for snubbing the generated spike noise with the first spike noise snubber when (a) the electronic device operates under the stand-by mode; (b) the third switch unit is switched from conduction to cut off; and (c) the spike noise is higher than the first predetermined voltage but lower than the second predetermined voltage. Both the first switch unit and the second switch unit are conducted for snubbing the spike noise with the first spike noise snubber and the second spike noise snubber when (d) the electronic device operates under the normal mode; (e) the third switch unit is switched from conduction to cut off; and (f) the spike noise is higher than the second predetermined voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
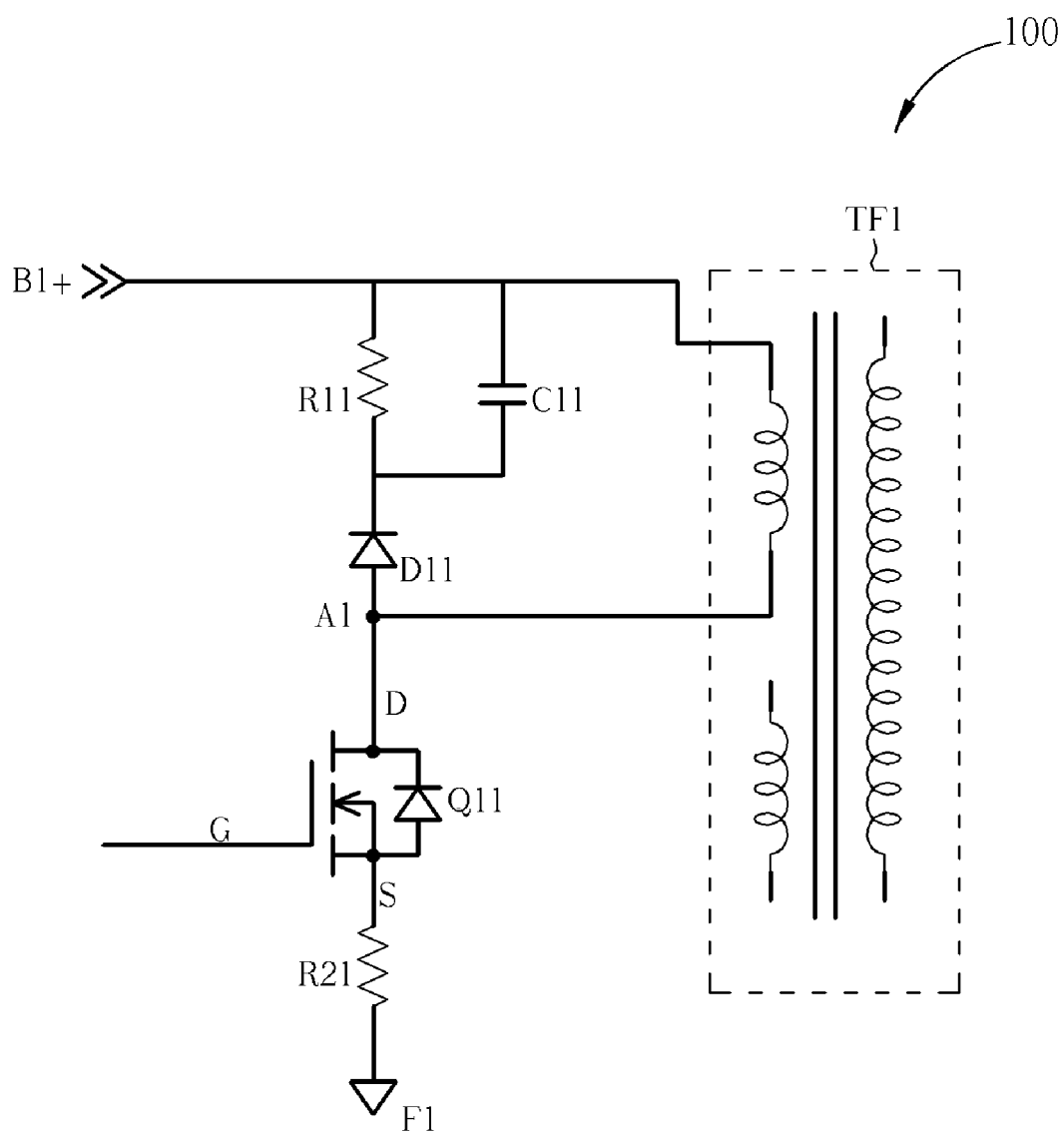
FIG. 1 is a diagram of a conventional power transform device.
Figure 2:
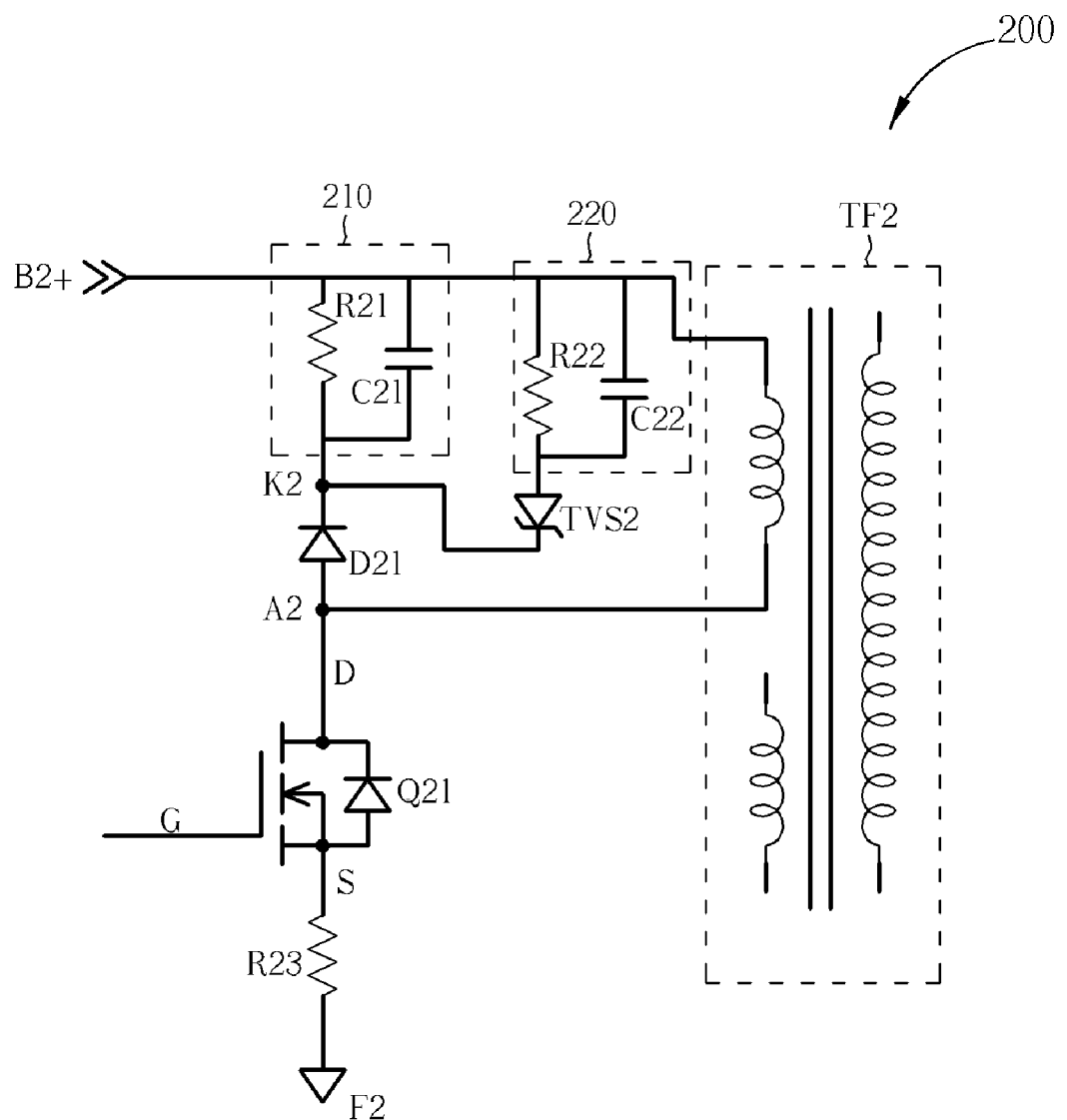
FIG. 2 is a diagram of a power transform device according to a first embodiment of the present invention.

Please refer to FIG. 2, which is a diagram of a power transform device 200 of the present invention. The power transform device 200 includes a capacitor C21, which has a capacitance of about 680-1000 pF in a preferred embodiment of the present invention, a capacitor C22, which has a capacitance of 10 KpF in a preferred embodiment of the present invention, a resistor R21, which has a resistance of 68 Kohm in a preferred embodiment of the present invention, a resistor R22, which has a resistance of 68 Kohm in a preferred embodiment of the present invention, a resistor R23, a first switch unit D21, a second switch unit TVS2, which may be a diode in a preferred embodiment of the present invention with an avalanche voltage of about 160-180 volts, a third switch unit Q21, a switch node A2, a power source node B2+, a ground node F2, and a transform element TF2. A first spike noise snubber 210 is formed from a series connection formed from both the capacitor C21 and the resistor R21. A second spike noise snubber 220 is formed from a series connection formed from both the capacitor C22 and the resistor R22. The third switch unit Q21 is also a metal-oxide semiconductor transistor the same as the switch unit Q11, for adjusting a resistance between the drain and the source of the third switch unit Q21 according to a voltage level at the gate of the third switch unit Q21 so that a connection between the drain and the source of the third switch unit Q21 may thus be switched to be open-circuited or short-circuited. Therefore, when the power transform device 200 is under the normal mode, besides power being required to be supplied with the power source node B2+, a voltage level at the gate of the third switch unit Q21 is periodically switched to high for periodically activating the third switch unit Q21. In a preferred embodiment of the present invention, the third switch unit Q21 may be periodically switched to be short-circuited or open-circuited according to the voltage level at the gate of the third switch unit Q21 with a pulse width modulation control technique or a pulse frequency modulation control technique so that a magnitude of power outputted by the transform element TF2 is well manipulated. The transform element TF2, which is the same as the transform element TF1, is a coupling element of double winding for transforming received currents to output power of a specific magnitude.

The power transform device 200 may be equipped for electronic devices such as a notebook or a monitor, where each of said electronic devices has a normal mode and a power-saving mode. For example, the notebook or the monitor remains in the normal mode, which indicates a high-load mode of the power transform device 200, when a user keeps on inputting characters with a keyboard. The notebook or the monitor also enters the power-saving mode, which indicates the low-load mode of the power transform device 200, after the user leaves said notebook or said monitor to be idle for a while.

In the present invention, the first spike noise snubber 210 is utilized for relieving spike noise when the power transform device 200 is under the low-load mode, where said spike noise is generated under the power-saving mode of the notebook or the monitor. And the second spike noise snubber 220 is utilized for relieving spike noise of the power transform device 200 under the high-load mode, which indicates the normal mode of the notebook or the monitor.

Figure 3:
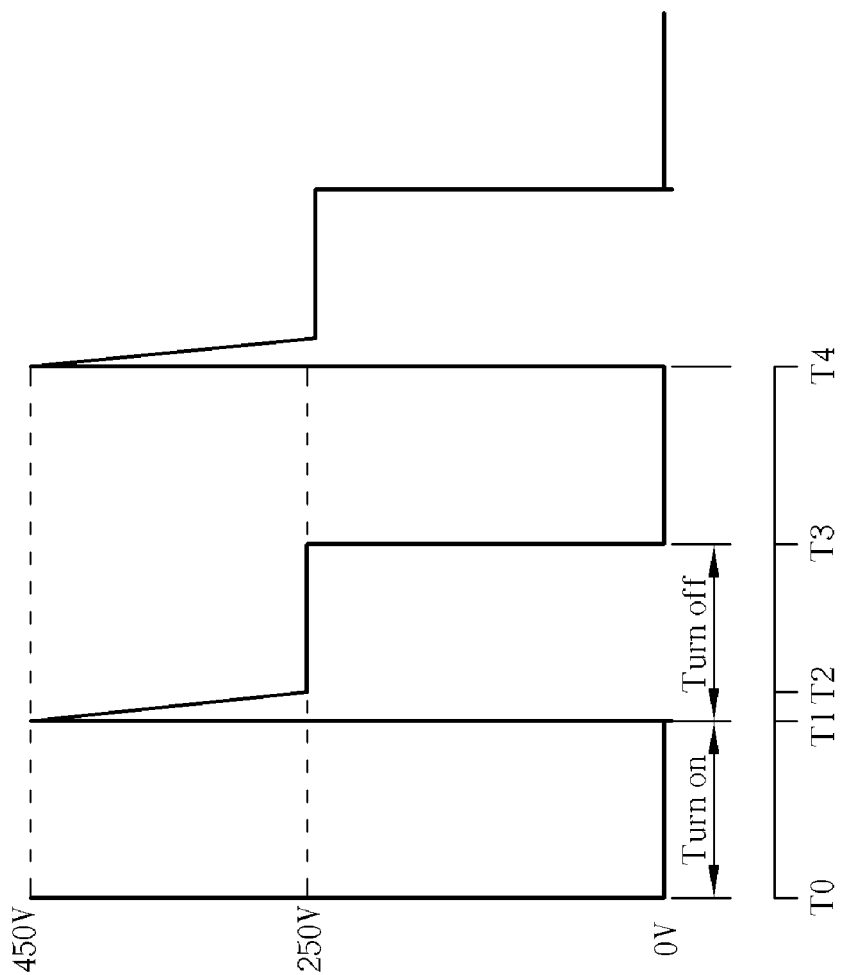
FIG. 3 illustrates a pulse plot at a switch node of the power transform device shown in FIG. 2 under the high-load mode.
Figure 4:
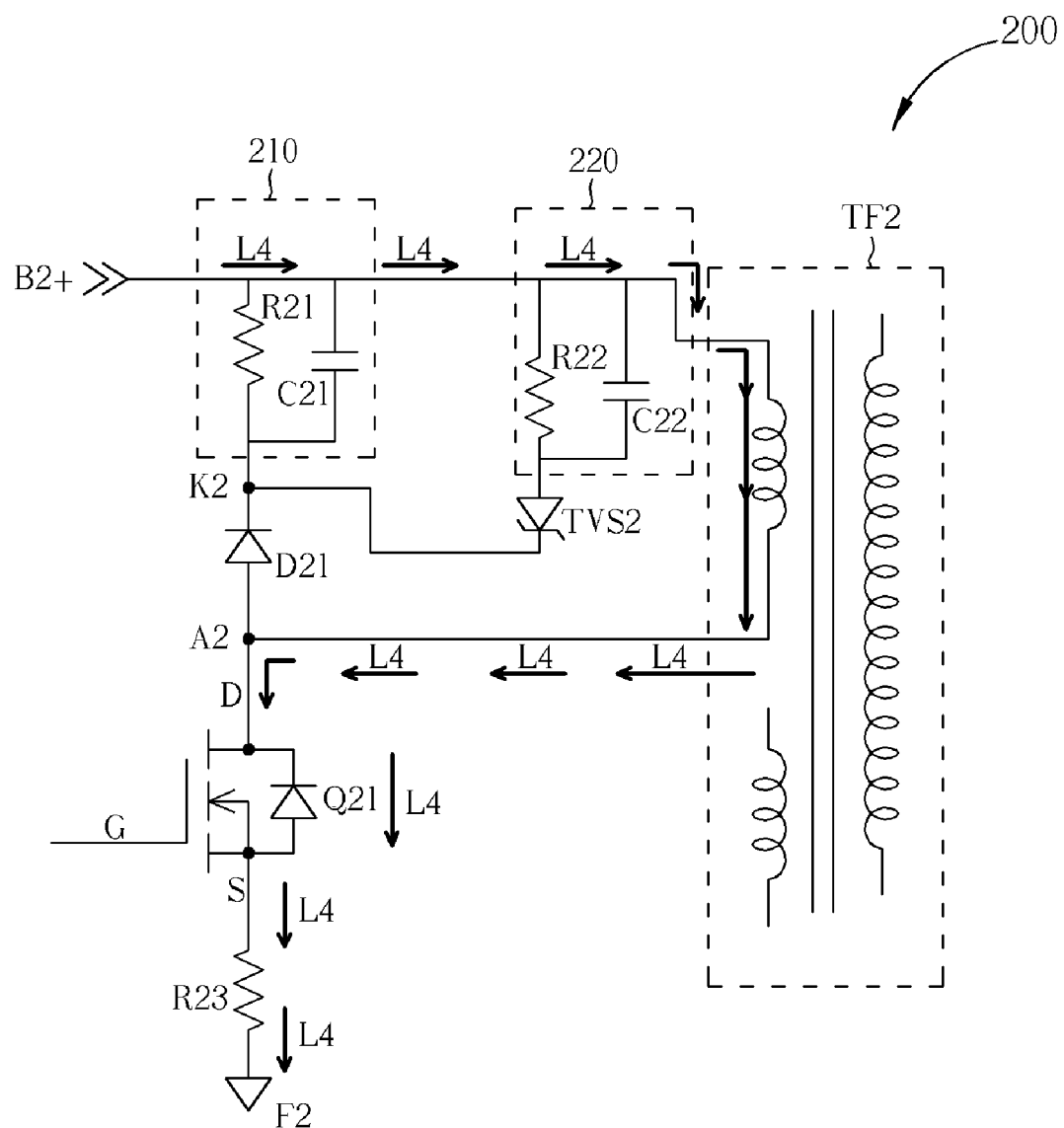
FIG. 4 illustrates a current flow under the high-load mode of the power transform device shown in FIG. 2 during duration between the times T0 and T1 shown in FIG. 3.
Figure 5:
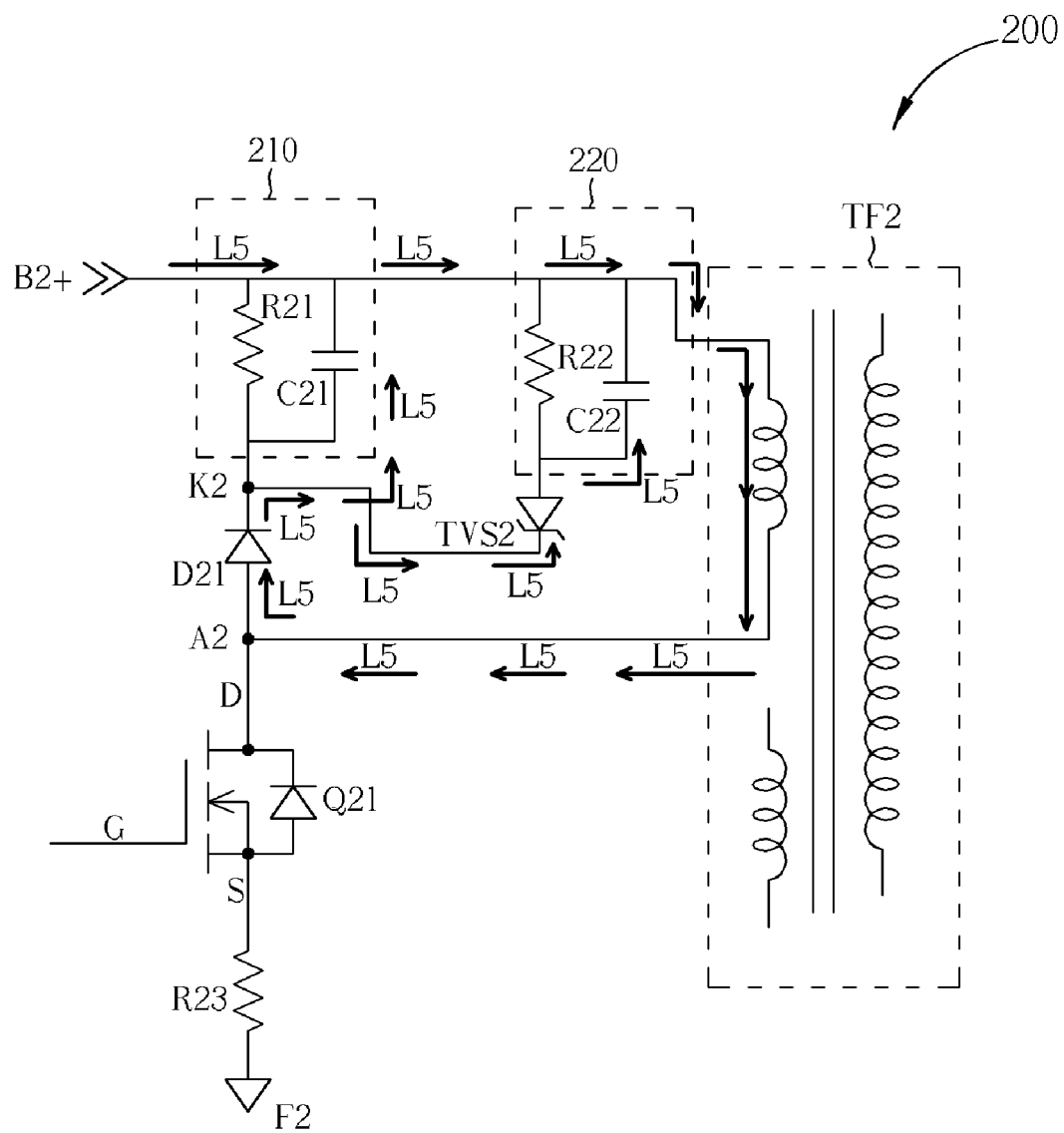
FIG. 5 illustrates a current flow under the high-load mode of the power transform device shown in FIG. 2 during duration from the times T1 and T2 shown in FIG. 3.
Figure 6:
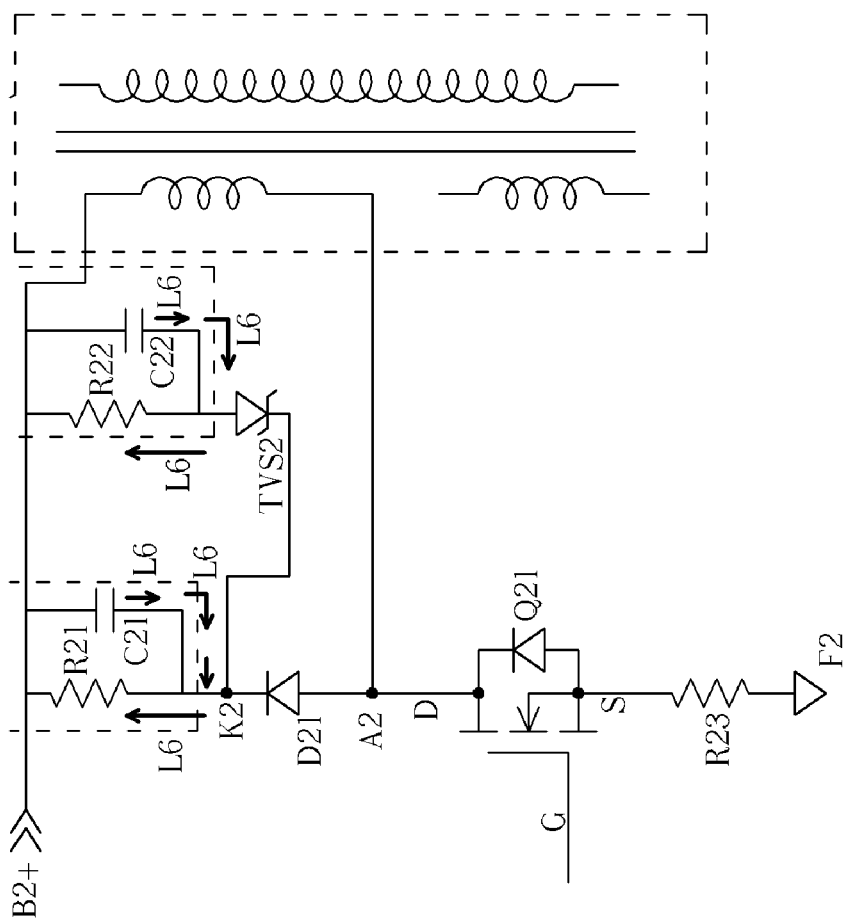
FIG. 6 illustrates a current flow under the high-load mode of the power transform device shown in FIG. 2 during duration from the times T2 and T3 shown in FIG. 3.
Figure 7:
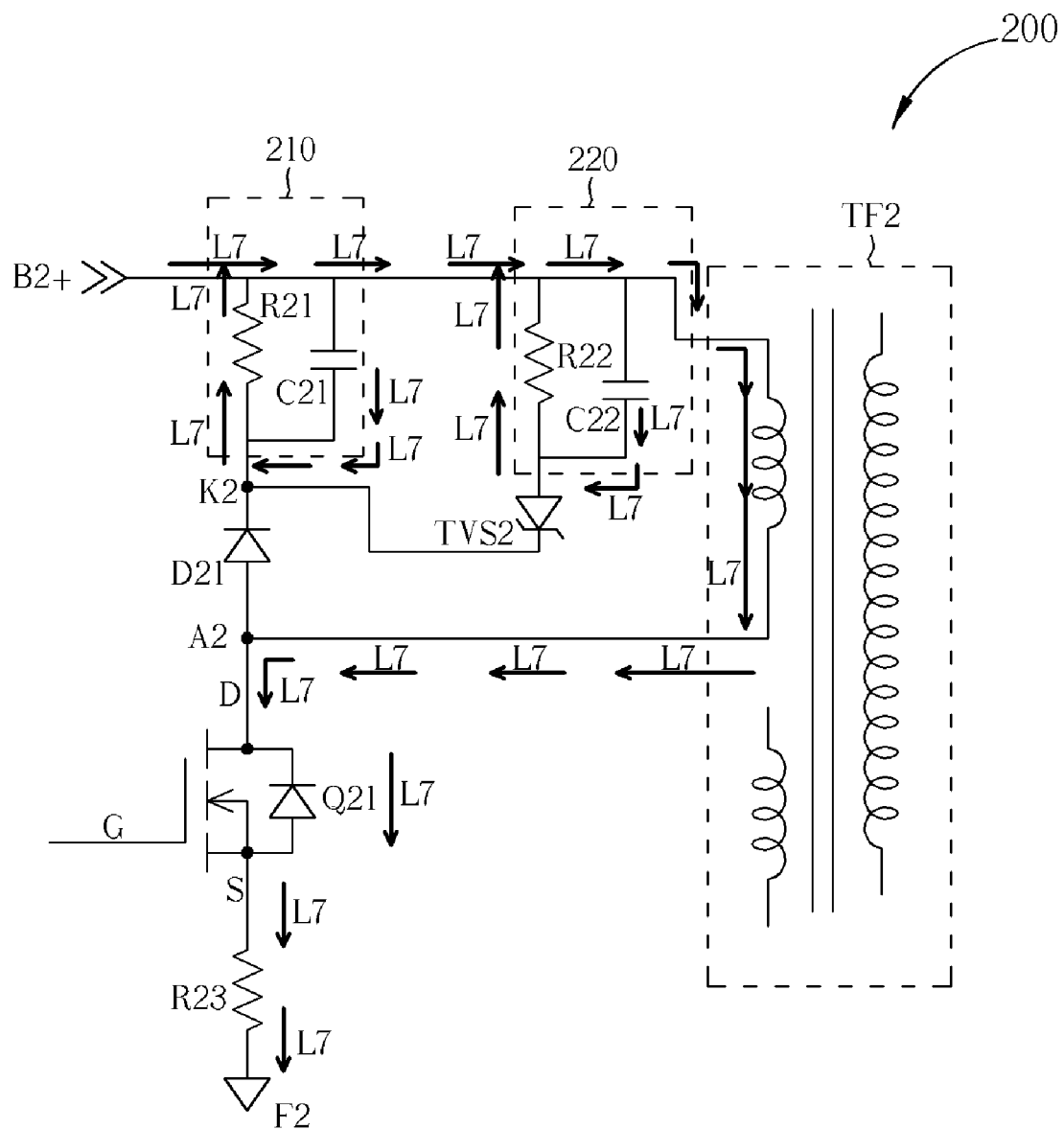
FIG. 7 illustrates a current flow under the high-load mode of the power transform device shown in FIG. 2 during duration from the times T3 and T4 shown in FIG. 3.

As mentioned above, the power transform device 200 may be operated under various modes according to various magnitudes of supplied voltages. Under the high-load mode of the power transform device 200 that indicates the normal mode of an electronic device, a cycle of the third switch unit Q21, where the cycle includes switching of the power transform device 200 through a short-circuited state, an open-circuited state, and the short-circuited state at last, is first described. Please refer to FIG. 3, FIG. 4, FIG. 5, FIG. 6, and FIG. 7. FIG. 3 illustrates a pulse plot at the switch node A2 of the power transform device 200 shown in FIG. 2 under the high-load mode. FIG. 4 illustrates a current flow L4 under the high-load mode of the power transform device 200 shown in FIG. 2 during duration between the times T0 and T1 shown in FIG. 3. FIG. 5 illustrates a current flow L5 under the high-load mode of the power transform device 200 shown in FIG. 2 during duration between the times T1 and T2 shown in FIG. 3. FIG. 6 illustrates a current flow L6 under the high-load mode of the power transform device 200 shown in FIG. 2 during duration between the times T2 and T3 shown in FIG. 3. FIG. 7 illustrates a current flow L7 under the high-load mode of the power transform device 200 shown in FIG. 2 during duration between the times T3 and T4 shown in FIG. 3.

As shown in FIG. 4, during the duration between the times T0 and T1, the power source node B2+ outputs power, and the third switch unit Q21 is short-circuited. At this time, the power outputted from the power source node B2+ is consumed by the transform element TF2, and therefore, a voltage level at the switch node A2 is not high enough for activating the first switch unit D21. For the abovementioned factors, the current flow L4 shown in FIG. 4 flows through the power source node B2+, the transform element TF2, the third switch unit Q21, the resistor R23, and the ground node F2 in order, without flowing through the first switch unit D21, the first spike snubber unit 210, and the second spike snubber unit 220.

As shown in FIG. 5, during the duration between the times T1 and T2 under the high-load mode of the power transform device 200, with the third switch unit Q21 being switched from a short-circuited state to an open-circuited state, a counter-electromotive force is generated from the transform element TF2, and then a higher spike voltage is generated at the switch node A2 so that a voltage level at the switch node A2 is increased to a magnitude capable of activating the first switch unit D21 before said higher spike voltage dissipates.

In a preferred embodiment of the present invention, the higher spike voltage is about 200 volts so that the voltage level at the switch node A2 is increased from 250 volts to 450 volts. Moreover, since the power transform device 200 is under the high-load mode, the generated spikes may be up to 200 volts. Refer to the current flow L5 shown in FIG. 5, the higher spike voltage activates the second switch unit TVS2, which has an avalanche voltage of about 160 volts to 180 volts. Therefore, after the higher spike voltage is transmitted through the first switch unit D21, said higher spike voltage is then transmitted through the first spike noise snubber 210 and the second spike noise snubber 220 simultaneously. The capacitors C21 and C22 are thus charged by the higher spike voltage, and the capacitors C21 and C22 also absorb power from said higher spike voltage for reaching an aim of relieving spike noise under the high-load mode.

As shown in FIG. 3, a spike voltage merely appear in an instant duration, and as shown in FIG. 6, during the duration between the times T2 and T3 and after the spike voltage dissipates, the voltage level at the switch node A2 is lower than the voltage level at the node K2 so that the first switch unit D21 is open-circuited. At this time, refer to the current flow L6 shown in FIG. 6, the resistor R21 consumes power stored in the capacitor C21 whereas the resistor R22 consumes power stored in the capacitor C22, though the abovementioned powers are not required to be discharged within the duration between the times T2 and T3.

As shown in FIG. 7, during duration between the times T3 and T4, the power transform device 200 enters a next cycle. Then the third switch unit Q21 is short-circuited again so that the current flow L7 shown in FIG. 7 is partially overlapped with the current flow L4. At this time, the first switch unit D21 remains open-circuited, and each of the resistors R21 and R22 discharges the spike voltage stored in the capacitors C21 and C22 respectively until said spike voltage is completely discharged.

Figure 8:
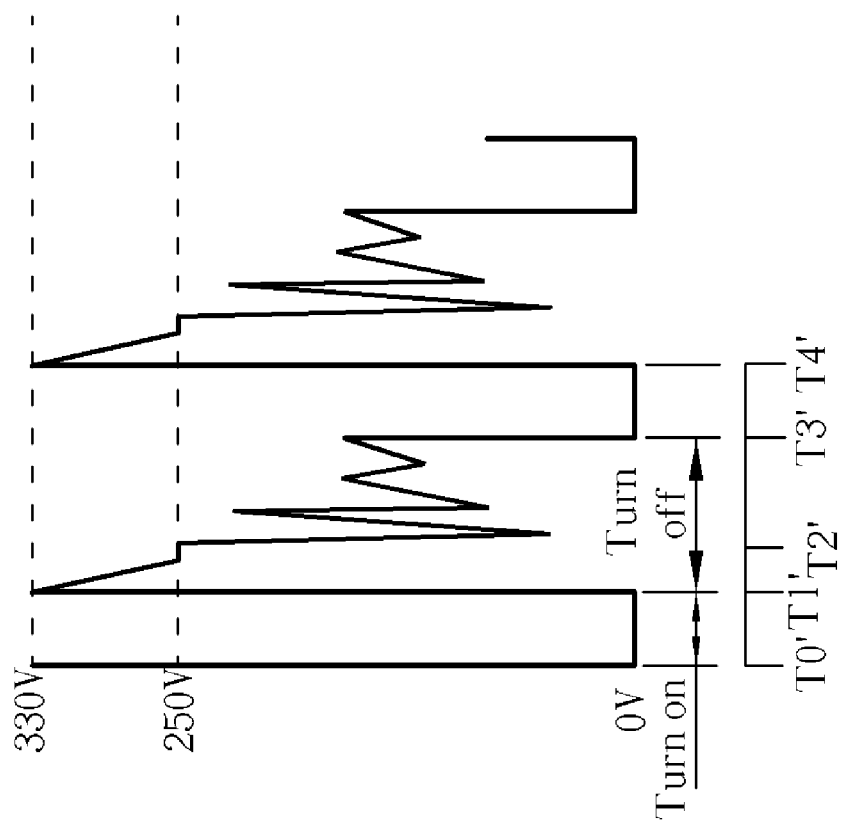
FIG. 8 is a diagram of a pulse plot of a switch node A2 under the low-load mode of the power transform device shown in FIG. 2.
Figure 9:
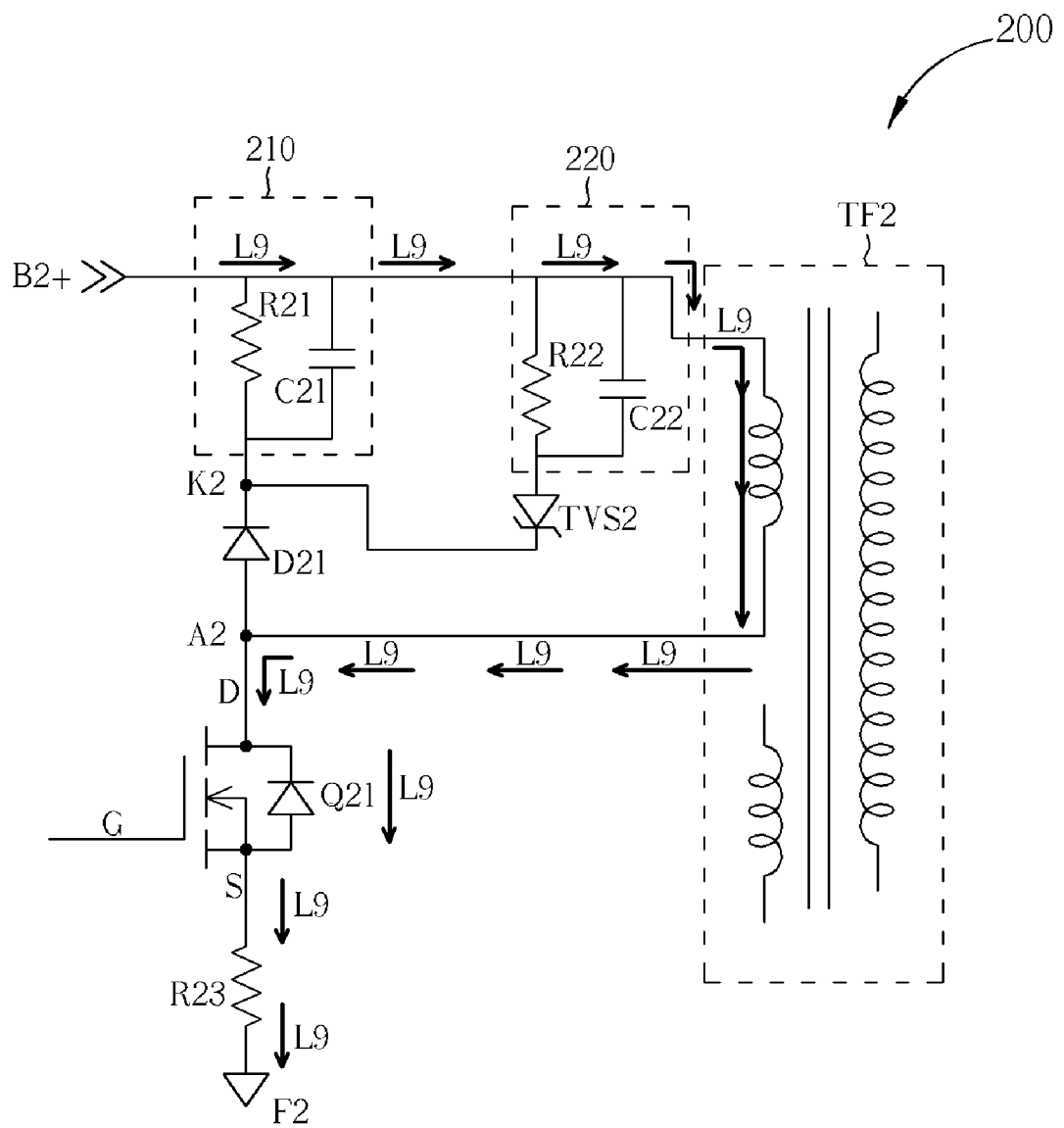
FIG. 9 is a diagram illustrating a current flow during the duration between the times T0' and T1' shown in FIG. 8 under the low-load mode of the power transform device shown in FIG. 2.
Figure 10:
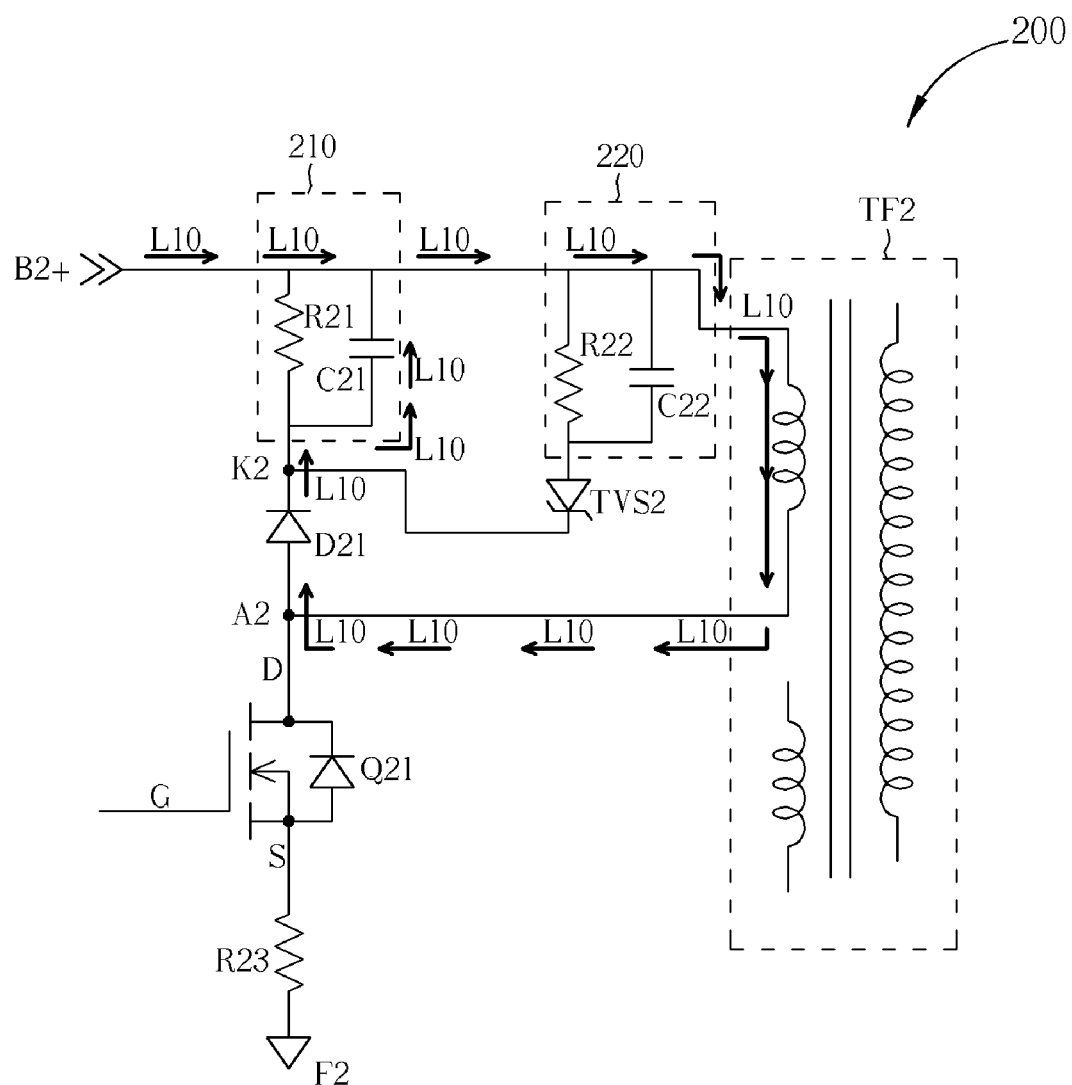
FIG. 10 is a diagram of a current flow during the duration between the times T1' and T2' shown in FIG. 8 under the low-load mode of the power transform device shown in FIG. 2.
Figure 11:
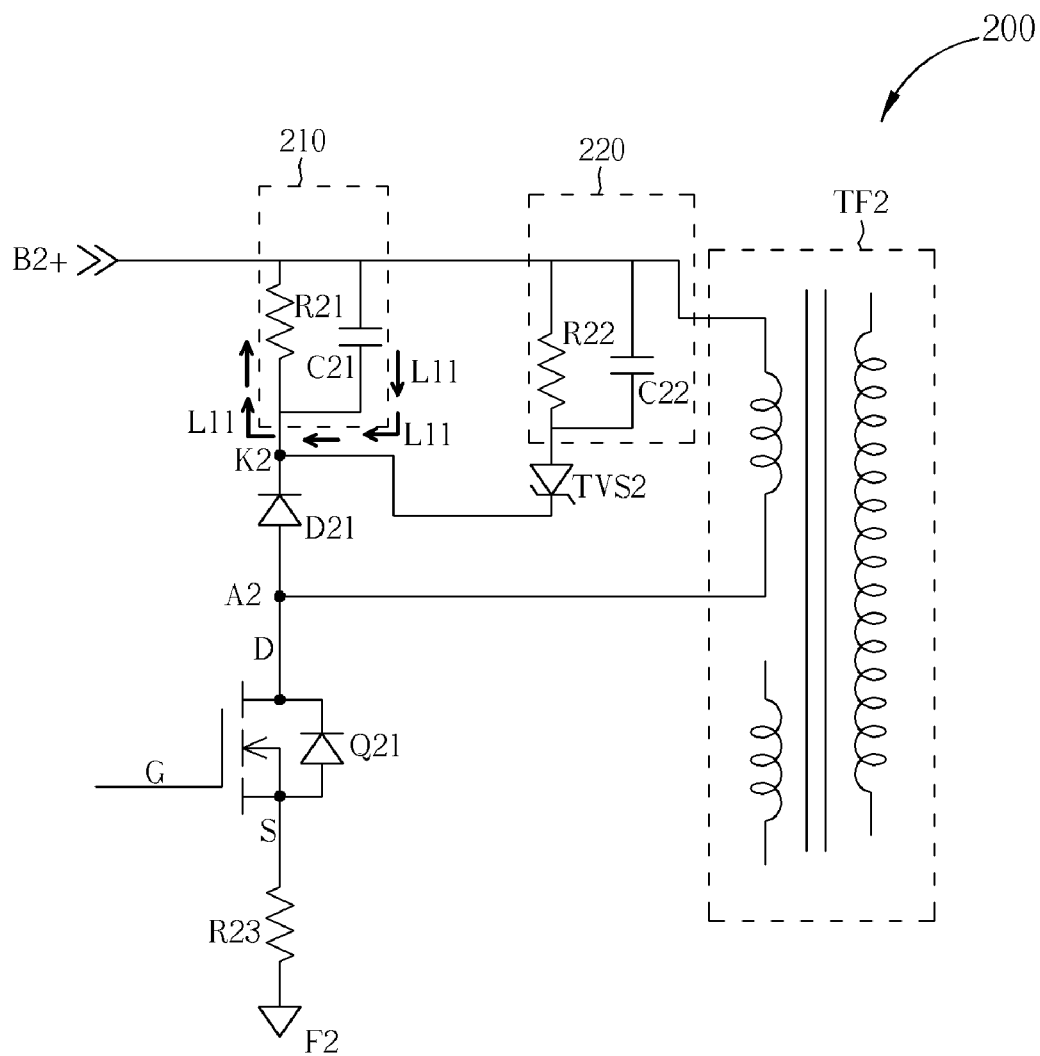
FIG. 11 is a diagram of a current flow during the duration between the times T2' and T3' shown in FIG. 8 under the low-load mode of the power transform device shown in FIG. 2.
Figure 12:
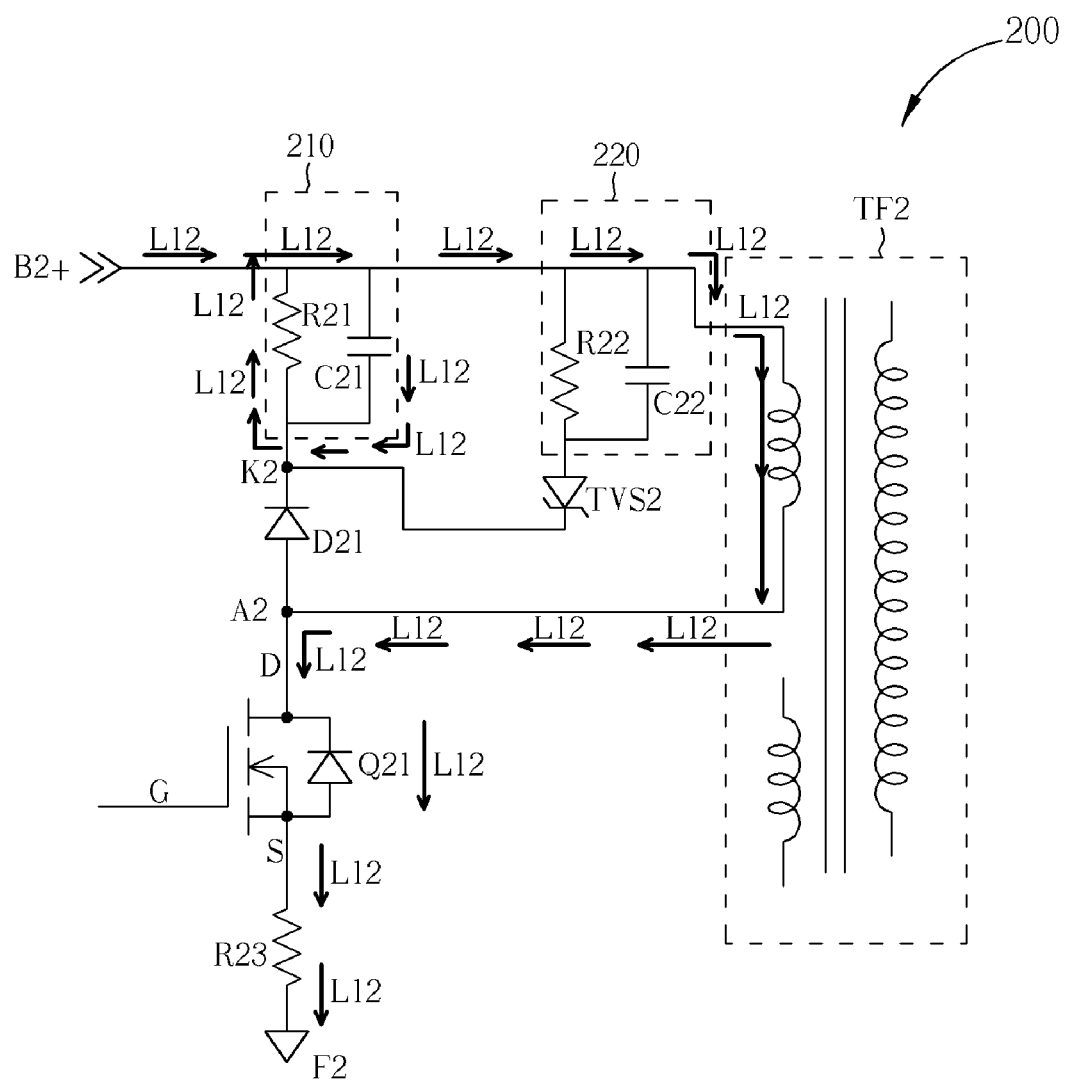
FIG. 12 is a diagram of a current flow during the duration between the times T3' and T4' shown in FIG. 8 under the low-load mode of the power transform device shown in FIG. 2.

The low-load mode of the power transform device 200, which is corresponding to the stand by mode of a related electronic device, is detailed described as follows. Please refer to FIG. 8, FIG. 9, FIG. 10, FIG. 11, and FIG. 12. FIG. 8 is a diagram of a pulse plot of the switch node A2 of the power transform device 200 under the low-load mode. FIG. 9 is a diagram illustrating a current flow L9 during the duration between the times T0' and T1' shown in FIG. 8 under the low-load mode of the power transform device 200 shown in FIG. 2. FIG. 10 is a diagram of a current flow L10 during the duration between the times T1' and T2' shown in FIG. 8 under the low-load mode of the power transform device 200 shown in FIG. 2. FIG. 11 is a diagram of a current flow L11 during the duration between the times T2' and T3' shown in FIG. 8 under the low-load mode of the power transform device 200 shown in FIG. 2. FIG. 12 is a diagram of a current flow L12 during the duration between the times T3' and T4' shown in FIG. 8 under the low-load mode of the power transform device 200 shown in FIG. 2.

As shown in FIG. 9, between the times T0' and T1', both of the power source node B2+ and the third switch unit Q21 are activated. Moreover, since a voltage level at the switch node A2 is not high enough to activate the first switch unit D21, the current flow L9 shown in FIG. 9 flows through the power source node B2+, the transform element TF2, the third switch unit Q21, the resistor R23, and the ground node F2 in order, instead of flowing through the first switch unit D21, the first spike noise snubber unit 210, and the second spike noise snubber unit 220.

As shown in FIG. 10, between the times T1' and T2', both the power source node B2+ and the third switch unit Q21 are shut down. Therefore, a counter electromotive force is generated on the transform unit TF2, and a spike voltage is generated on the switch node A2 so that a voltage level of the switch node A2 is increased to a magnitude capable of activating the first switch unit D21 before the spike voltage dissipates. Moreover, since the power transform device 200 is under the low-load mode, after the current flow L10 shown in FIG. 10 flows through the first switch unit D21, the second switch unit TVS2 having an avalanche voltage of between 160 volts and 180 volts is not activated, and the current flow L10 does not flow through the second spike noise snubber unit 220 either. At this time, the current flow L10, which flows through the first spike noise snubber 210, merely charges the capacitor C21 for reaching an aim of relieving spike noise under the low-load mode by the capacitor C21, which absorbs power from the spike voltage.

As shown in FIG. 11, between the times T2' and T3', the spike voltage has been absorbed so that a voltage level at the switch node A2 is lower than a voltage level at the node K2, and the first switch unit D21 is thus shut down. At this time, as the current flow L11 shown in FIG. 11 continues to flow, the resistor R21 consumes power stored by the capacitor C21, though, said power may not be consumed completely between the times T2' and T3'.

As shown in FIG. 12, between the times T3' and T4', the power transform device 200 enters a next cycle. Therefore, both the power source node B2+ and the third switch unit Q21 are activated again so that the current flow L12 shown in FIG. 12 is partially overlapped with the current flow L8 shown in FIG. 8. At the same time, the first switch unit D21 remains open-circuited, and the resistor R21 keeps discharging the stored spike voltage in the capacitor C21 until said stored spike voltage dissipates completely.

Figure 13:
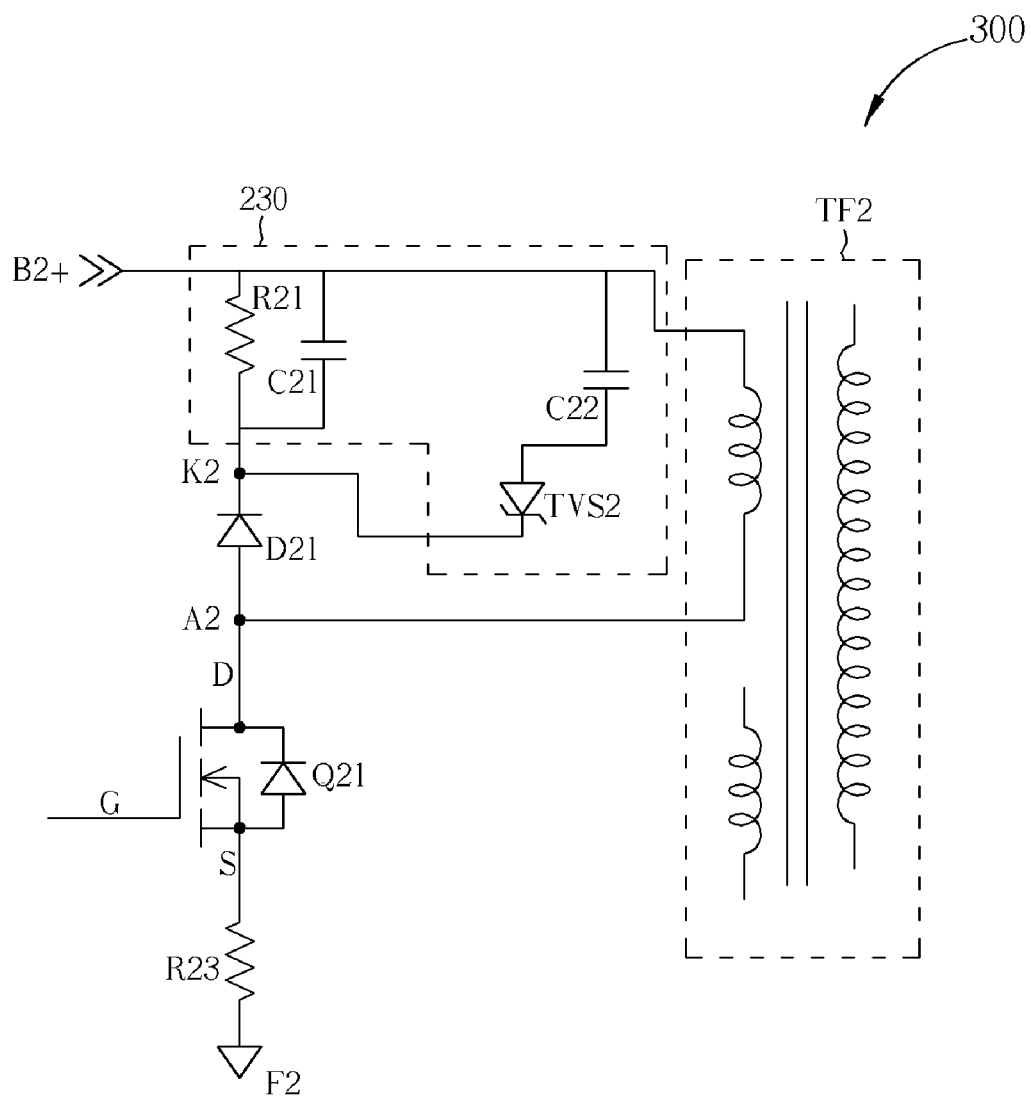
FIG. 13 is a diagram of the power transform device according to a second embodiment of the present invention.

Moreover, after the resistor R22 of the power transform device 200 is removed to form an open-circuited state at the location where it was, another power transform device 300 of the present invention is thus generated. Note that the efficiency of absorbing and discharging a spike voltage of the power transform device 300 is close to said efficiency of the power transform device 200. Please refer to FIG. 13, which is a diagram of the power transform device 300 of the present invention. The spike noise snubber unit 230 includes a resistor R21, capacitors C21 and C22, and a second switch unit TVS2. Operations of the power transform device 300 are similar to the abovementioned operations of the power transform device 200. However, the resistance of the resistor R21 has to be more precisely chosen because of the absence of the resistor R22 so that the power transform device 300 properly adjusts a magnitude of its current flow within a specific range for absorbing and discharging the spike voltage under both the low-load mode and the high-load mode.

Under the high-load mode of the power transform device 300, when a spike voltage generated from a counter electromotive force of the transform element TF2 activates the first switch unit D21, a high voltage level resulted from the high-load mode also activates the second switch unit TVS2. Therefore, both the capacitors C21 and C22 absorb power of said spike voltage until said spike voltage dissipates so that the first switch unit D21 becomes open-circuited. After the first switch unit D21 is shut down, since the capacitor C22 stores most of the power from the spike voltage, a current flow through the second switch unit TVS2 is reversed so that said stored power is discharged through the resistor R21. Note that the resistor R21 also discharges power stored in the capacitor C21, therefore, with a properly chosen resistance of the resistor R21, the power transform device 300 may discharge the spike voltage completely through the resistor R21 before both the power source node B2+ and the third switch unit Q21 are shut down.

Note that the second switch unit TVS2 may be implemented with a zener diode, and the third switch unit Q21 may be implemented with a N-type or a P-type metal oxide semiconductor transistor.

In summary, in the power transform device of the present invention, a plurality of spike noise snubber units is utilized, and capacitances of said plurality of spike noise snubber units are also adjusted according to various requirements for relieving electromagnetic disturbances and spike noise. When the power transform device of the present invention is under the high-load mode, a high spike voltage activates several spike noise snubber units so that power of said high spike voltage is absorbed, and electromagnetic disturbances are relieved thereby. When the power transform device of the present invention is under the low-load mode, a spike noise snubber unit having a smaller capacitance may be utilized for absorbing power for relieving spike noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power transform device for reaching low acoustic noise comprising:
    a power source node;
    a switch node;
    a ground node;
    a transform element electrically coupled between the power source node and the switch node;
    a first spike noise snubber having a first terminal, which is electrically coupled to the power source node, and a second terminal;
    a first switch unit electrically coupled between the second terminal of the first spike noise snubber and the switch node;
    a second spike noise snubber having a first terminal, which is electrically coupled to the power source node, and a second terminal;
    a second switch unit electrically coupled between the second terminal of the first spike noise snubber and the second terminal of the second spike noise snubber; and
    a third switch unit electrically coupled between the ground node and the switch node for selectively conducting or cutting off a current flowing between the ground node and the switch node, and spike noise is generated when the third switch unit is switched from conduction to cut off;
    wherein the first switch unit is conducted when a voltage difference between the second terminal of the first spike noise snubber and the switch node is larger than a first predetermined voltage;
    wherein the second switch unit is conducted when a voltage difference between the second terminal of the first spike noise snubber and the second terminal of the second spike noise snubber is larger than a second predetermined voltage, which is larger than the first predetermined voltage;
    wherein the first switch unit is conducted for snubbing the generated spike noise with the first spike noise snubber when the generated spike noise is higher than the first predetermined voltage but lower than the second predetermined voltage;

wherein both the first switch unit and the second switch unit are conducted for snubbing the generated spike noise with both the first spike noise snubber and the second spike noise snubber simultaneously when the generated spike noise is higher than the second predetermined voltage.

2. The power transform device of claim 1 wherein the transform element selectively operates under a high-loading mode or a low-loading mode;

wherein the first switch is conducted for snubbing the generated spike noise with the first spike noise snubber when (a) the transform element operates under the low-loading mode; (b) the third switch unit is switched from conduction to cut off; and (c) the spike noise is higher than the first predetermined voltage but lower than the second predetermined voltage;

wherein both the first switch unit and the second switch unit are conducted for snubbing the spike noise with the first spike noise snubber and the second spike noise snubber when (d) the transform element operates under the high-loading mode; (e) the third switch unit is switched from conduction to cut off; and (f) the spike noise is higher than the second predetermined voltage.

3. The power transform device of claim 2 wherein the high-loading mode indicates that an electronic device driven by the power transform device operates under a normal mode, which indicates that the electronic device is switched on and is operated by a user.

4. The power transform device of claim 2 wherein the low-loading mode indicates that an electronic device driven by the power transform device operates under a stand-by mode, which indicates the electronic device is switched but not operated by a use.

5. The power transform device of claim 2 wherein the power transform device is utilized as a pulse-width modulation power supply; wherein the third switch unit is operated according to a low-loading pulse signal when the transform element operates under a low-loading mode; wherein the third switch unit is operated according to a high-loading pulse signal when the transform element operates under a high-loading mode; the duty cycle ratio of the high-loading pulse signal is larger than said duty cycle ratio of the low-loading pulse signal.

6. The power transform device of claim 1 wherein the first predetermined voltage is approximately 336 volts whereas the second predetermined voltage is approximately 360 volts.

7. The power transform device of claim 1 wherein the second switch unit is a diode, wherein an avalanche voltage for the diode to be reversely conducted is between the first predetermined voltage and the second predetermined voltage.

8. The power transform device of claim 7 wherein the avalanche voltage is between 160 volts and 180 volts.

9. The power transform device of claim 1 wherein the second switch unit is a zener diode.

10. The power transform device of claim 1 wherein the third switch unit is a N-type metal oxide semiconductor transistor.

11. The power transform device of claim 1 wherein the third switch unit is a P-type metal oxide semiconductor transistor.

12. An electronic device selectively operating under a normal mode or a stand-by mode for reaching low acoustic noise comprising:

a power source node;
a switch node;
a ground node;
a transform element electrically coupled between the power source node and the switch node;
a first spike noise snubber having a first terminal, which is electrically coupled to the power source node, and a second terminal;
a first switch unit electrically coupled between the second terminal of the first spike noise snubber and the switch node;
a second spike noise snubber having a first terminal, which is electrically coupled to the power source node, and a second terminal;
a second switch unit electrically coupled between the second terminal of the first spike noise snubber and the second terminal of the second spike noise snubber; and
a third switch unit electrically coupled between the ground node and the switch node for selectively conducting or cutting off a current flowing between the ground node and the switch node, and spike noise is generated when the third switch unit is switched from conduction to cut off;

wherein the first switch unit is conducted when a voltage difference across the first switch unit is larger than a first predetermined voltage;

wherein the second switch unit is conducted when a voltage difference across the second switch unit is larger than a second predetermined voltage, which is larger than the first predetermined voltage;

wherein the first switch is conducted for snubbing the generated spike noise with the first spike noise snubber when (a) the electronic device operates under the stand-by mode; (b) the third switch unit is switched from conduction to cut off; and (c) the spike noise is higher than the first predetermined voltage but lower than the second predetermined voltage;

wherein both the first switch unit and the second switch unit are conducted for snubbing the spike noise with the first spike noise snubber and the second spike noise snubber when (d) the electronic device operates under the normal mode; (e) the third switch unit is switched from conduction to cut off; and (f) the spike noise is higher than the second predetermined voltage.

13. The electronic device of claim 12 wherein the electronic device operates under the normal mode when the electronic device is switched on and operated by a user.

14. The electronic device of claim 12 wherein the electronic device operates under the stand-by mode when the electronic device is switched on but not currently operated by a user.

15. The electronic device of claim 12 wherein the electronic device issues a low-loading pulse signal to the third switch unit when the electric device operates under the stand-by mode; wherein the electronic device issues a high-loading pulse signal to the third switch unit when the electric device operates under the normal mode; and wherein the duty cycle ratio of the high-loading pulse signal is larger than the duty cycle ratio of the low-loading pulse signal.

16. The electronic device of claim 12 wherein the first predetermined voltage is approximately 336 volts, and the second predetermined voltage is approximately 360 volts.

17. The power transform device of claim 12 wherein the second switch unit is a diode, wherein an avalanche voltage for the diode to be reversely conducted is between the first predetermined voltage and the second predetermined voltage.

18. The power transform device of claim 17 wherein the avalanche voltage is between 160 volts and 180 volts.

19. The power transform device of claim 12 wherein the second switch unit is a zener diode.

20. The power transform device of claim 12 wherein the third switch unit is a N-type metal oxide semiconductor transistor.

21. The power transform device of claim 12 wherein the third switch unit is a P-type metal oxide semiconductor transistor.

* * * * *